United States Patent [19]
Carpenter

[11] Patent Number: 5,873,388
[45] Date of Patent: Feb. 23, 1999

[54] SYSTEM FOR STABILIZATION OF PRESSURE PERTURBATIONS FROM OXIDATION SYSTEMS FOR TREATMENT OF PROCESS GASES FROM SEMICONDUCTOR MANUFACTURING OPERATIONS

[75] Inventor: Kent H. Carpenter, Stamford, Conn.

[73] Assignee: ATMI EcoSys Corporation, San Jose, Calif.

[21] Appl. No.: 659,865

[22] Filed: Jun. 7, 1996

[51] Int. Cl.[6] .................................. F17D 3/00; F17D 1/20; G05D 7/00; B01J 8/00
[52] U.S. Cl. .................................. 137/624.15; 137/624.2; 422/112; 422/113; 422/114; 423/210
[58] Field of Search ........................... 422/105, 110, 422/112, 113, 114; 137/624.15, 624.2

[56] References Cited

U.S. PATENT DOCUMENTS

| | | | |
|---|---|---|---|
| 4,238,460 | 12/1980 | Aiken et al. ........................... | 423/210 |
| 4,834,020 | 5/1989 | Bartholomew ........................ | 118/719 |
| 4,993,358 | 2/1991 | Mahawili .............................. | 118/715 |
| 5,000,221 | 3/1991 | Palmer ............................... | 137/505.38 |
| 5,011,520 | 4/1991 | Carr et al. ............................ | 55/228 |
| 5,113,789 | 5/1992 | Kamian ............................... | 118/715 |
| 5,118,286 | 6/1992 | Sarin .................................. | 432/2 |
| 5,122,391 | 6/1992 | Mayer ................................. | 427/126.3 |
| 5,136,975 | 8/1992 | Bartholomew et al. ................ | 118/715 |
| 5,199,856 | 4/1993 | Epstein et al. ........................ | 417/312 |
| 5,211,729 | 5/1993 | Sherman ............................. | 55/186 |
| 5,220,940 | 6/1993 | Palmer ............................... | 137/487.5 |
| 5,251,654 | 10/1993 | Palmer .............................. | 137/501 |
| 5,255,709 | 10/1993 | Palmer .............................. | 137/501 |
| 5,255,710 | 10/1993 | Palmer .............................. | 137/501 |
| 5,304,398 | 4/1994 | Krussell et al. ...................... | 427/255.3 |
| 5,320,124 | 6/1994 | Palmer ............................... | 137/501 |
| 5,361,800 | 11/1994 | Ewing ............................... | 137/495 |
| 5,450,873 | 9/1995 | Palmer et al. ........................ | 137/114 |
| 5,456,280 | 10/1995 | Palmer .............................. | 137/501 |

*Primary Examiner*—Ponnathapura Achutamurthy
*Attorney, Agent, or Firm*—Steven J. Hultquist; Oliver A. M. Zitzmann

[57] ABSTRACT

A pressure damping system for damping pressure perturbations incident to switching of switchable flow control means in a fluid flow circuit. The pressure surge damping system comprises a throttle valve in the circuit, with the throttle valve and switchable flow control means being constructed and arranged for selective adjustment of the throttle valve when the switchable flow control means is switched, to attenuate pressure perturbations incident to switching of the switchable flow control means. The pressure surge damping system of the invention may be employed in a multi-vessel oxidation system for the treatment of semiconductor effluent gas, or in other applications involving periodic or cyclic switched flows which generate an upstream-propagating pressure wave detrimental to an upstream process facility.

21 Claims, 3 Drawing Sheets

SYSTEM FOR STABILIZATION OF PRESSURE PERTURBATIONS FROM OXIDATION SYSTEMS FOR TREATMENT OF PROCESS GASES FROM SEMICONDUCTOR MANUFACTURING OPERATIONS

BACKGROUND OF THE INVENTION

1. Field of the Invention

This invention relates to process systems in which downstream gas or vapor pressure fluctuations can adversely affect an upstream process, e.g., reaction, deposition or coating systems involving discharged gas streams which are in fluid flow communication with upstream components or unit operations of the process system. More particularly, the invention relates to apparatus and method for stabilizing the pressure fluctuations attendant the use of such systems, in applications in which the gaseous effluent streams are generated by upstream processes which are adversely affected, e.g., susceptible to upset, by downstream pressure fluctuations.

2. Description of the Related Art

In the field of treatment of gaseous effluents in the manufacturing of semiconductor materials, devices, and products, storage and memory articles, and the use of photolithography for oligonucleotide characterization, a wide variety of effluent gases are produced in the process facility.

A large number of these effluent gases contain volatile organic compounds (VOCs), such as alkanols, organics, photoresists, and breakdown products of photoresists and other reagents, and a wide variety of other gases which are desirably removed from the waste gas streams produced in the process facility, before the waste gas is vented from the process facility to the atmosphere. For example, VOCs present in the exhaust streams of semiconductor manufacturing tools include isopropyl alcohol, photoprocessing vapors, and spin-on glass (SOG) solvents.

The normal options for the treatment of VOC-containing gas streams include combustion and catalytic oxidation, which in either case may further include preliminary concentration of the gas stream VOC components to be removed by the treatment process.

Combustion processes are old and well-established in the art for the treatment of VOC-containing waste gas streams, however, catalytic oxidation processes are in increasingly widespread use as a result of their high efficiency and cost-effectiveness. By catalytically converting the VOCs oxidatively to the combustion products carbon dioxide and water, the catalytic oxidation process affords an effective solution to the problem of VOC-containing waste stream treatment.

In catalytic oxidation treatment, the VOC-containing stream is heated to an elevated temperature appropriate to the oxidation reaction, and the resulting heated effluent gas stream then is contacted with an oxidation catalyst to oxidize the VOC components of the effluent gas stream to yield carbon dioxide and water.

The treated gas stream, at elevated temperature, then may be passed through a heat exchanger in heat exchange relationship with the feed effluent gas stream to the treatment system to recover the sensible heat of the treated gas stream and concurrently preheat the feed effluent gas stream, particularly when it is desired to carry out autothermal catalytic oxidation.

Catalytic oxidation may advantageously be conducted in a multibed system for continuous treatment of the VOC-containing effluent gas stream. In such multibed systems, a bed of oxidation catalyst is provided in each of multiple vessels, with a bed of thermal ballast (heat sink) material upstream from the catalyst bed. At any given time, at least one bed is on-stream, through which the VOC-containing effluent gas stream is cyclically sequentially and repetitively flowed for contacting with the oxidation catalyst therein. Concurrently, the non-active vessel(s) of the system, i.e., those not removing VOCs, are being utilized for heat recovery, by passage of the effluent gas stream, reduced in VOC content and at high temperature from the catalytic oxidation in the active vessel, from the active vessel outlet discharge end, to the non-active vessel, so that the sensible heat of the effluent gas stream is given up to the thermal ballast material in the non-active vessel.

Advantageously, the hot gas stream from the active vessel is flowed countercurrently with respect to the flow of the VOC-containing gas stream through the active vessel. In one useful apparatus arrangement, the outlet ends of respective vessels in the treatment system may be manifolded or otherwise disposed in flow communication with one another, so that the discharged (catalytically oxidized) stream from the active vessel is passed to the outlet discharge end of the non-active vessel for flow through the non-active vessel from its outlet discharge end to its inlet end, and final discharge from such inlet end to a discharge means for the catalytic oxidation system.

The multiple vessels of the VOC-abatement catalytic oxidation system thus may be interconnected by valved manifolds at their inlet/outlet ends, and arranged, e.g., with cycle timer means, so that one of the vessels is actively on-stream, in VOC-abating operation, with the VOC-containing stream being flowed therethrough for treatment, while other vessel(s) are undergoing heat recovery of the sensible heat from the VOC-reduced gas stream (regeneration), with cyclic switching of the vessels, so that the fully regenerated vessel resumes active operation, and the active vessel then undergoes regeneration, to accommodate continuous treatment of the VOC-containing gas stream.

In a simplest of such manifolded vessels arrangement, two vessels are arranged so that one is on-stream, while one is off-stream (undergoing regeneration), and with cyclic reversing operation of each of the vessels between the on-stream and off-stream states, involving reversal of the flow direction of the gas stream through the each of the vessels. In a linked two vessel arrangement, the VOC-containing gas stream is flowed through a first vessel from the inlet to the outlet end thereof, undergoing catalytic oxidation in such vessel. The VOC-depleted gas stream discharged from the outlet end of the first bed then is flowed in the reverse direction, from the outlet end to the inlet end, of a second vessel, for regeneration thereof. After the vessels have been operating in such mode for a first predetermined time, the valves in the manifold at the inlet end of the vessels are switched, to divert the VOC-containing gas stream from the first vessel to the second vessel.

After a second predetermined time period during which the VOC-containing gas stream is flowed to the inlet of the second vessel for passage therethrough from the inlet end to the outlet end thereof, and the VOC-depleted gas stream discharged at the outlet end of the second vessel is reverse-flowed through the first vessel, from the outlet end to the inlet end thereof, for regeneration of the first vessel, the vessels are again switched, by appropriate opening and closure of the valves in the inlet manifold joining the inlet ends of the respective first and second vessels in selective flow communication with the source of the VOC-containing gas stream.

During the switching of the respective beds in the above-described VOC abatement catalytic oxidation system, the contemporaneous opening and closure of the valve in the feed manifold of the multibed unit causes a pressure pulsation or surge, as the valves in the manifold open and shut, to divert the VOC-containing stream from one vessel to the other.

Such pressure surge, incident to the switching of the manifold valves in the multibed system of manifolded vessels, is particularly disadvantageous in process systems where the VOC-containing gas stream is generated in a pressure-sensitive or flow-sensitive operation, such as the aforementioned spin-on-glass processes, or other coating unit operations or steps, such as are widely employed in the semiconductor industry. There thus is a switchover perturbation in the catalytic oxidation system, during which there is no flow through any of the vessels in the multivessel system, and during which a pressure wave travels sonically upstream in the effluent treatment system, to the source of the VOC-containing vapors.

This back-surge then can severely adversely affect the upstream process. In instances where the VOC-containing gas derives from a coating or deposition process step, the pressure wave can radically change the pressure conditions in the deposition or coating chamber, and the thickness of the laid-down material will correspondingly radically vary from point to point on the substrate. In consequence, the substrate structure being processed may be rendered wholly unsuitable for its intended purpose.

For example, the layers being formed on a substrate may be grossly over-thick or under-thick, or may be highly uneven within the desired uniform coating region of the base structure. The process as a result of the pressure perturbation may therefore yield defective or unusable product. This thickness problem involves depth of focus considerations in the semiconductor industry, where the depth of focus of the steppers which are exposing the wafers at small line geometries may be no greater than the thickness of the resist itself, e.g., on the order of one micron and below, as the line size geometries employed. In such applications, thickness variations in the resist will cause certain portions of the resist to be out of focus.

Such thickness variation is an enormous problem in wafer processes, particularly when photoresist is being applied onto what may already be a tortuous or otherwise significantly nonuniform topography. Thus, any factors which cause the resist layer thickness to vary appreciably may severely impact wafer quality, such as coater bowl exhaust flow rate.

Currently, it is reported that resist is being commercially applied to six-inch wafers within a tolerance of ±3 Angstroms, and efforts are being made to reduce thickness variations even further, below this level.

In such systems, any significant pressure variations which are propagated from the downstream exhaust treatment system to the upstream resist application process can greatly disrupt the uniformity of the applied resist coating. The same is true of other film formation, coating, and deposition operations which are "coupled" in the gas phase with a downstream exhaust gas treatment system.

The foregoing discussion has been directed to exhaust gas treatment catalytic oxidation systems such as are widely employed for the treatment of process gases from semiconductor manufacturing operations. In addition, various regenerative oxidation systems are employed for treatment of effluent gas streams deriving from process facilities such as semiconductor manufacturing operations. Such regenerative oxidation systems are susceptible to the same problems and deficiencies as discussed hereinabove in reference to catalytic oxidation systems.

Further, there exist a wide variety of other process systems which involve flow circuits in which pressure waves, surges or spikes are detrimental and result from the switching of process flows in the system. Such flow circuits may involve a wide range of unit operations, including phase separation, chemical reaction, solubilization, physical mixing, gas-liquid contacting, distillation, etc., in which the flow is periodically reversed, diverted or otherwise switched from one flow path or flow direction to another. The present invention is directed to a solution to the pressure variation problems incident to such system flow changes.

Relative to the present invention hereinafter more fully disclosed, relevant art in the general field of the present invention is discussed below.

U.S. Pat. No. 5,361,800 issued Nov. 8, 1994 to James H. Ewing discloses a liquid delivery and vaporization system including a positive displacement pump assembly for delivering a continuous volume flow at a constant rate to a vaporizer assembly for flash vaporizing the liquid. This effort at solving the problems attendant the occurrence of pressure oscillations in a process system utilizes a mechanical actuated butterfly valve. This control system reads exhaust pressure from a CVD tool and reacts to the pressure sensing by incrementally opening or closing the valve. However, typical high pressure oscillations have frequencies in the range of from about 0.05 to 0.20 second. The valve control system described in the Ewing patent has difficulty responding to oscillations in this frequency range.

A mechanical progressive valve is commercially available from Progressive Technologies, Inc. which includes an exhaust controller, but such valve assembly is highly specific to the source of the effluent gas (i.e., "tool-specific" in relation to process tools used in semiconductor manufacturing facilities), and is relatively expensive.

U.S. Pat. No. 5,118,286 issued Jun. 2, 1992 to Michael C. Sarin describes a method and apparatus for operating a semiconductor wafer processing furnace in which multiple wafers are positioned in a reactor tube, and reaction gas is passed through the tube between the wafers. An inlet of an exhaust gas tube is located downstream from the wafers in the reactor tube. Spent reaction gas flows through the exhaust gas tube and an exhaust valve connected to the exhaust gas tube, and into an exhaust gas scrubber system. The total gas pressure in the reaction tube near the inlet of the exhaust tube is measured relative to ambient atmospheric pressure by a differential manometer and the flow of spent gases in the exhaust tube is controlled by comparing the pressure-indicating signal to a preset signal indicative of a preselected desired constant pressure to produce an error signal. The exhaust valve is automatically controlled as to its open character by the magnitude of the error signal. The differential manometer and control circuitry described in this reference are disclosed to control the measured pressure in the reactor tube with an accuracy of approximately 0.01 torr above ambient atmospheric pressure.

Other art of interest includes: U.S. Pat. No. 5,211,729 issued May 18, 1993 to Robert C. Sherman (baffle/settling chamber for removal of solid particulates from exhaust of semiconductor deposition equipment while reducing pressure fluctuation in the exhaust); U.S. Pat. No. 4,834,020 issued May 30, 1989 to Lawrence D. Bartholomew, et al. (atmospheric pressure chemical vapor deposition system with metering device connected to exhaust allowing continuous removal of reactant products, with wire scraper orifice cleaning arrangement); U.S. Pat. No. 4,993,358 issued Feb. 19, 1991 to Imad Mahawili (CVD reactor with independently adjustable multiple gas inlet orifices and exhaust ports); U.S. Pat. No. 5,113,789 issued May 19, 1992 to George D. Kamian (self-cleaning flow control orifice mounted in exhaust line for CVD apparatus); U.S. Pat. No. 5,136,975 issued Aug. 11, 1992 to Lawrence D. Bartholomew, et al. (injector with plates including hole arrays, defining a cascaded hole matrix arrangement for provision of uniform flow); and U.S. Pat. No. 5,450,873 issued Sep. 19, 1995 to David W. Palmer, et al. (regulator including a path, through which fluid passes, and a movably mounted piston having a frontal face, which is exposed to fluid in the path at a constriction point, and a distal face, which is exposed to a reference pressure, with the piston is mounted so that the weight of the piston exerts a force on the piston in a direction that tends to widen the path at the constriction point, and with a force being exerted on the piston, preferably by a spring under compression, in a direction that tends to narrow the path at the constriction point).

It therefore would be a significant advance in the art, and is therefore an object of the present invention, to provide a means and method for modulating and suppressing the effects of pressure perturbations incident to flow changes in a flow circuit, e.g., such as result from the periodic cyclic switching of valves or other flow control means (e.g., fluidic gates or routers, caps, closures, thermostatic acutators, etc.) in the flow circuit.

It is an object of the invention to provide an improved means and method for damping pressure perturbations incident to switching of valves or other flow control means in a fluid flow circuit of an oxidation system, such as a catalytic or regenerative oxidation system for treatment of effluent gas from semiconductor manufacturing operations.

Other objects and advantages of the invention will be more fully apparent from the ensuing disclosure and appended claims.

SUMMARY OF THE INVENTION

The present invention relates to means and method for suppressing pressure surges in a fluid flow system wherein valves or other flow control means are periodically actuated to switch the direction or path of fluid flow.

In one aspect, the present invention relates to means and method for suppressing pressure surges in a fluid flow system, wherein at least one valve or other flow control means is periodically actuated to switch the direction or path of fluid flow in the fluid flow system, comprising a throttle valve constructed and arranged to constrict the flow during the time that the flow control means is being actuated to switch the direction of the flow in the circuit, in such manner as to dampen pressure surge phenomena in the circuit, in relation to operation of the fluid flow system in the absence of the throttle valve. The throttle valve may be arranged to partially close at the same time that the flow control means is actuated to switch the direction of fluid flow in the system, or the throttle valve could be constructed and arranged to partially close slightly earlier or slightly later than the start of actuation (e.g, by transmission of a start signal) of the flow control means. Cycle time program and control means may be employed to effectuate the action of the throttle valve in concert with the operation of the flow control means, including timing and delay devices, pneumatic delays, limit and proximity switches, and the like, as may be readily implemented within the skill of the art in practicing the invention.

In another aspect, the fluid flow system comprises a fluid flow circuit coupled in flow communication with a fluid flow driver, such as a blower, compressor, fan, or the like, for discharging fluid from the fluid flow circuit, and a throttle valve is provided in the circuit in inlet proximity to the fluid flow driver. The throttle valve is constructed and arranged to adjustably constrict the flow at the inlet to the fluid flow driver during the time that the switchable flow control means in the circuit is being actuated to switch the direction of flow in the circuit, in such manner as to dampen pressure surge phenomena in the circuit, in relation to operation of the fluid flow system in the absence of the fluid flow driver and throttle valve.

In an alternative aspect, the fluid flow driver and throttle valve may be disposed upstream of the flow control means, with the throttle valve being located downstream from the fluid flow driver to simulate the resistance (pressure drop) of the system with which the flow control means is associated.

The throttle valve is preferably constructed, arranged and operated with a response time (of reaction to an actuating signal) which is significantly shorter than the response time of the switchable flow control means in the fluid flow circuit.

In a particular aspect, the fluid flow circuit may comprise a catalytic or regenerative oxidation system including a multiplicity of vessels manifolded together, wherein the fluid flow system comprises a source of VOC-containing gas, which is flowed sequentially through selected one(s) of the respective vessels in the system for VOC-abatement treatment thereof, wherein effluent gas of reduced VOC content is flowed through other(s) of such vessels for regeneration thereof, and wherein the flow of gas through the vessels is cyclically reversed, by switching of the flow control means in the fluid flow circuit.

Other aspects, features and embodiments of the invention are more fully described hereafter, and will be more fully apparent from the ensuing disclosure and appended claims.

DETAILED DESCRIPTION OF THE INVENTION AND PREFERRED EMBODIMENTS THEREOF

While the invention is described primarily hereinafter in application to a manifolded multibed catalytic oxidation system, it will be appreciated that the invention is not thus limited in utility, but may be implemented and employed in any of a variety of other systems, e.g., a fluid flow system in which a flow manifold or conduit is valved for periodic switching operation, to direct or divert a fluid stream into a selected one of multiple flow paths, depending on the placement and state (open or closed) of the valves or other flow control means therein, and wherein the switching operation entails pressure surges which are propagated in the fluid flow system and are undesired or otherwise disadvantageous.

Examples of such other fluid flow systems include multi-vessel adsorbent bed systems for carrying out physical adsorption involving pressure-swing and/or thermal swing desorption of sorbate in the vessels, in which each of the vessels sequentially and alternatingly undergoes active operation with sorptive removal of sorbable fluid components from the gas stream flowed through the vessel, followed by desorption of the sorbate from the sorbent material in the vessel, to renew the vessel for subsequent active operation, wherein such cycle is continuingly and repetitively carried out for each of the component vessels of the system.

Further examples include ion exchange liquid treatment systems including beds which are sequentially and alternatingly active and regenerative in operation, as employed for treatment of liquid to remove specific ionic species therefrom.

It will be recognized that the invention is broadly applicable to any of a wide variety of flow systems in which fluid flow is periodically and repetitively reversed, by switching of valves or other flow control means, thereby causing pressure wave perturbations in the flow circuit of the system.

Figure 1:
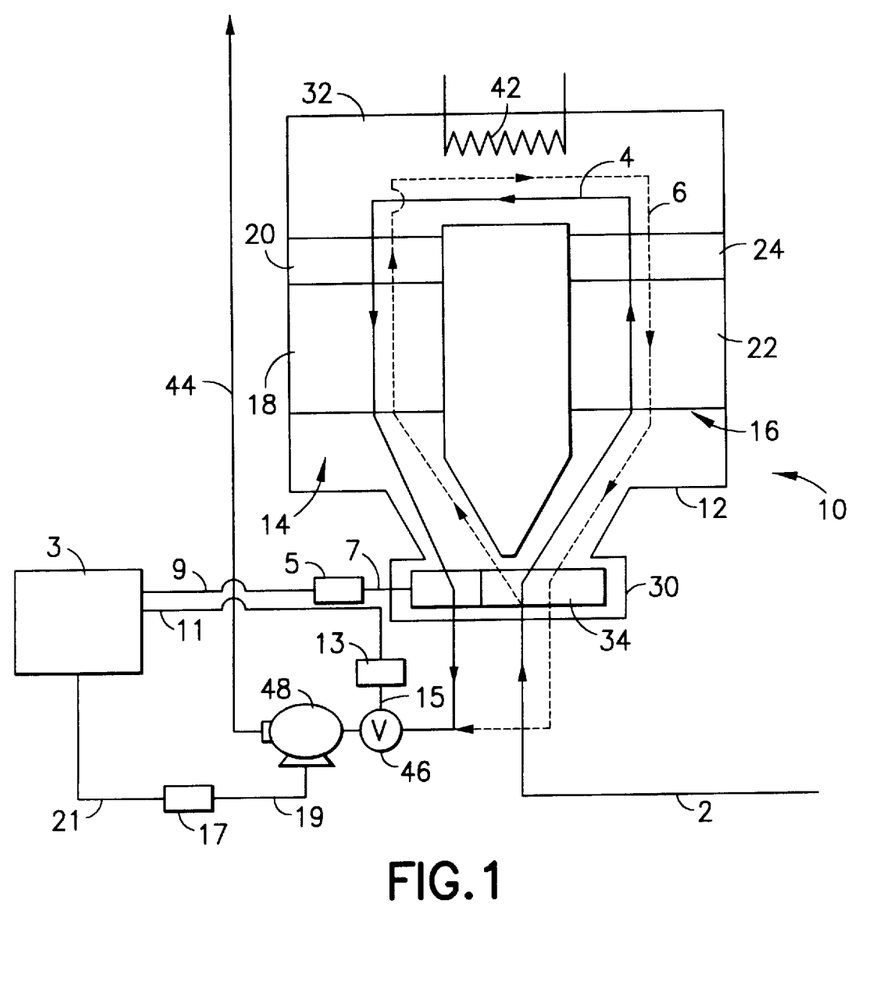
FIG. 1 is a schematic representation of a catalytic oxidation process system according to one embodiment of the present invention.

Referring now to the drawings, FIG. 1 is a schematic representation of a catalytic oxidation process system 10 according to one embodiment of the present invention. The catalytic oxidation process system 10 comprises a housing 12, which as shown has symmetrically arranged left-hand and right-hand portions constituting vessels 14 and 16 of the system.

The left-hand vessel 14 contains a thermal ballast bed 18, overlying which is an oxidation catalyst bed 20. The respective beds may be segregated from one another, or arranged contiguously, with an interposed screen or grate member to prevent interspersal of solid particles resulting from migration of solids from each bed to the other.

The thermal ballast bed 18 may be formed of particulate solids having a suitably high heat capacity characteristic, such as a ceramic, metal, or composite material of high specific heat value.

The oxidation catalyst bed 20 may comprise an oxidation catalyst in suitable particulate form, of any appropriate composition. For example, the catalyst bed particles may comprise a high surface area porous substrate on which the catalytic species, e.g., platinum, palladium, platinum-rhenium or other catalytic oxidation metal, is deposited. A preferred composition is platinum-rhenium catalyst on an alumina support in the form of particles or pellets having an average particle size on the order of 0.5 inch diameter.

In like manner, the right-hand vessel 16 comprises a thermal ballast bed 22 and an oxidation catalyst bed 24.

The respective vessels are joined in closed flow communication at their upper ends by a connecting plenum 32, accommodating flow of gas between the vessels, in either left-to-right fashion or right-to-left fashion, depending on the arrangement of the flow control valve 34 in the lower section 30 of housing 12, as hereinafter more fully described.

The housing 12 in plenum 32 features a heater 42, to provide start-up and supplemental heating as also hereinafter more fully described.

The catalytic oxidation process system 10 receives VOC-containing gas in feed conduit 2, and VOC-reduced gas is discharged from housing 12 in effluent discharge line 44, containing blower 48 and throttle valve 46 therein.

The valve 34 is schematically depicted, and represents a valve arrangement in which flow is selectively switchable between vessel 14 and vessel 16.

In the system as shown in FIG. 1, the VOC-containing gas is introduced in line 2 and valve 34 is arranged to direct such VOC-containing gas into the right-hand vessel 16, for flow therethrough in the direction indicated by line 4. Thus, the VOC-containing gas flows upwardly through the bed 22 of thermal ballast material, which by virtue of its heat content effects heating of the influent VOC-containing gas to suitably high temperature, e.g., on the order of 300° C.

The resulting heated VOC-containing gas then flows through the oxidation catalyst bed 24 for catalytic oxidative removal of the VOC content of the gas to an appropriate extent, e.g., greater than 98% of the influent VOC concentration. The VOC-reduced gas then flows through plenum 32 to vessel 14. The gas flows through vessel 14 in the reverse direction (relative to the direction of gas flow through vessel 16), flowing from the upper end of vessel 14 to the lower end and out of the lower section 30 of the housing 12 into discharge line 44.

Blower 48 is sized, arranged and operated to provide the appropriate pressure drop and flow rate for the gas stream being flowed through the process system 10.

After a predetermined period of operation, involving flow in the manner shown (upflowing through vessel 16 and downflowing through vessel 14), the valve 34 is switched, to divert the influent VOC-containing gas from feed line 2 into vessel 14 for upflow therethrough, cross-flow from left-to-right through the plenum 32 and down-flow through vessel 16, along the gas flow path indicated by dashed line 6 in FIG. 1. Thus, subsequent to switching of valve 34, the flow pattern is reversed with respect to the gas flows prior to switching of the valve.

By this arrangement, the heat of the thermal ballast material in bed 22 is replenished after switching, by take-up of the sensible heat from the catalytically oxidized gas discharged from oxidation catalyst bed 20 in vessel 14, so that the heat content of thermal ballast bed 22 is increased to a value appropriate for resumption of active processing and catalytic oxidation of VOC-containing gas in vessel 16.

It will therefore be appreciated that the valve 34 is periodically and cyclically switched, to direct the flow to one of the two vessels, so that one of the beds is carrying out heating and catalytic oxidation of the VOC-containing gas, while the thermal ballast bed in the other vessel is being heated by take-up of the sensible heat of the catalytically oxidized gas flowed therethrough.

By such arrangement, it is possible to operate in steady-state fashion in an autothermal mode, functioning at low temperatures on the order of about 300° C. and exploiting the heat generated by the VOC oxidation reaction to maintain the bed of oxidation catalyst at its necessary elevated operating temperature.

The valve 34 is schematically illustrated in FIG. 1, it being understood that such valve structure may comprise a unitary switching valve or other flow control mechanism, or alternatively such valve structure may comprise multiple valve devices which are synchronized or otherwise coordinated to effect the continued periodic switching of the respective vessels for continuous sequential and alternative steps of active on-stream processing and non-active regeneration.

The heater 42 may be employed to provide supplemental make-up heat to the catalytically oxidized stream in use of the process system, however the catalytic oxidation in the respective catalytic oxidation beds 20 and 24 most preferably is carried out so that such heating in plenum 32 is not required (i.e., so that the catalytic oxidation combustion of VOC generates sufficient heat to operate the system without actuation of the heater 42), or at least provides only a minor portion of the total heat required for catalytic oxidation operation.

Heater 42 is, however, utilized during system start-up. During cold start-up conditions, the switching valve 34 or other valve (not shown) in feed line 2 is closed to prevent flow of VOC-containing gas to housing 12. A recirculation pump or blower (not shown) may be actuated to recirculate air through the housing 12 in closed-loop fashion through the respective vessels 14 and 16, while heater 42 heats the circulating air to a temperature which in turn heats the thermal ballast beds 18 and 22 to appropriate temperature, e.g., on the order of 250° C.

When the operating temperature is reached during such start-up procedure, the valve 34 or other valve in feed line 2 (not shown) is opened, and the VOC-containing gas is flowed through feed line 2 into housing 12 to one of the respective vessels 14 and 16, depending on the initial selected position of the flow-directing valve 34.

By the foregoing arrangement, the VOC-containing gas stream is catalytically oxidized to convert the VOC content to carbon dioxide, water and heat. The effluent in discharge line 44 thus comprises clean air, water vapor and carbon dioxide, of substantially diminished VOC concentration (relative to the influent VOC-containing gas to the system).

Thus, as the on-stream thermal ballast bed is cooled below the desired operating temperature, valve 34 is actuated to switch the direction of the gas stream and direct the VOC-containing gas through the other vessel. The other bed, which has previously been heated to a temperature above its operating temperature, thereby heats the gas stream to the oxidizing temperature, for catalytic oxidation in the associated bed of oxidation catalysts in such vessel. Once autothermal operation is reached, it will continue as long as adequate concentration of VOCs are present in the gas stream to provide the exothermic heat of oxidation. If the VOC concentration is low in the influent gas stream, the heater 42 may be actuated to provide the necessary heat energy to maintain operating temperature.

Catalytic oxidation systems of the type shown in FIG. 1 may be provided in any suitable size appropriate to the facility in which same is employed to abate VOC content of effluent gases, e.g., to process gas flows in a range of as low as 30 cubic feet per minute to as high as 70,000 cubic feet per minute. In semiconductor manufacturing operations, such as for example isopropanol drying of wafers, processing of solvents used for (spin on glass) planarization of advanced integrated circuits, photoresist processing, and polyimide processing, the flow rate of VOC-containing gas typically is in the range of from about 30 cubic feet per minute to about 500 cubic feet per minute.

In the absence of the throttling valve 46, the switching of valve 34 would cause a sonic pressure pulse that would propagate upstream through feed line 2 to the upstream source (not shown in FIG. 1) of the VOC-containing vapors, but the throttling valve 46 functions to dampen and modulate such pressure pulse. The throttling valve 46 is constructed, arranged and operated to maintain a constant pressure at the inlet of blower 48 by matching the overall pressure drop to the pressure drop between vessels 14 and 16, to suppress any significant pressure wave phenomena which in the absence of such attenuation would propagate upstream through feed conduit 2.

Thus, present invention utilizes a throttling valve which in the FIG. 1 embodiment is positioned at the inlet to the blower, and with the throttling valve being timed to partially close at the same time the reversing valves begin to change the flow of fluid in the system. By timing the duration of action of the throttling valve and the amount of closure achieved by such throttling valve, sufficient back pressure is generated to exactly match the loss of flow resistance when the reversing valves are open during their transition. In such manner, the pressure pulse otherwise generated each time the valve assembly is switched to reverse the flow of fluid, is suppressed and the pressure differential experienced by the fluid in feed line 2 is minimized during operation.

The blower preferably is positioned downstream of the catalytic oxidation beds in the embodiment of FIG. 1, but such positioning, while preferred, is not essential, and in the general practice of the invention, a fluid driver means may be positioned in any suitable manner in the overall process system including the flow circuit in which it is desired to attenuate the deleterious pressure variation activity. For example, the blower may be positioned upstream of the catalytic oxidation beds, with the throttle valve downstream of the blower to simulate the resistance (pressure drop) of the recuperative beds of the oxidation system.

In the FIG. 1 embodiment, the switchable valve assembly 34, the throttling valve 46, and the blower 48 may be respectively, or independently, controlled by suitable monitoring and adjustment/control means. The switchable valve assembly 34 is shown in FIG. 1 as being coupled by signal transmission wire 7 to a monitoring/actuator unit 5 which is coupled by means of signal transmission wire 9 to central processing unit (P(CPU) 3. The throttling valve 46 is coupled by signal transmission wire 15 to actuator unit 13, which in turn is joined by signal transmission wire 11 to CPU 3. Finally, the blower 48 may be joined to monitor/actuator unit 17 by signal transmission wire or sensor line 19, with the monitor/actuator unit 17 being in turn coupled with CPU 3 by signal transmission line 21. It will be recognized that the flow circuit including the pressure variation attenuation system of the invention may be monitored, operated, actuated and controlled in any suitable manner using any suitable means and/or methods.

Central processing unit 3 may comprise a programmable computer, microprocessor, or other suitable control means, which may, for example, be constructed and arranged to carry out a cyclic operation, involving periodic switching of switchable valve assembly 34 by means of monitor/actuator unit 5, which is actuated in response to a cycle time program stored in CPU 3, from which control signals are generated and sent by wire 9 to unit 5, for transmission in wire 7 to the valve assembly 34. By such arrangement, the valve assembly 34 may be switched in accordance with the cycled time program, or in other periodic or repeating manner.

Contemporaneously, the actuator 13 for throttling valve 46 is actuated during the switching of switchable valve assembly 34, to dampen the pressure surge incident to such switching.

Additionally, and optionally, the monitor/actuator unit 17 may be programmed to provide selective adjustment of the speed of blower 48, in response to sensed process conditions, or selective adjustment by an operator, as inputted to CPU 3.

The flow switching valve may be of any suitable type, including gate, globe, ball, plug, butterfly, diaphragm, pinch, float, star, or any other suitable type or types.

The throttling valve 46 likewise may be of any appropriate type, and may, for example, comprise a butterfly valve which is provided with adjustable stop means for limiting the travel of the active valve (butterfly) element during use of the throttling valve. The throttling valve is actuated by any suitable type actuator (pneumatic, electrical, etc.), which desirably provides a response time which is faster than the response time of the switchable valve assembly used for directing the flow of fluid in the system.

The flow switching valve assembly and the throttling valve may, for example, be coupled by diode and solenoid means, to actuate the throttling valve and main flow switching valves in sequence or concert with one another. For example, the throttling valve may be arranged to partially close at the same time as the main flow control valves, or alternatively the throttle valve may be arranged to be partially closed slightly earlier or slightly later than the main flow control valve start signal (for reversing operation). Microprocessor or other control (e.g., personal computer and software) systems may be employed for automatic control, to switch the main flow control valves and the throttling valve in appropriate sequence.

Operational characteristics can be selectively established by any suitable means and/or methods, using suitable timing and delay devices, such as pneumatic delays, limit and proximity switches, etc. Specific timing, speed, and throttle valve settings can be readily determined by those skilled in the art, without undue experimentation, by the simple expedient of varying such operational parameters while measuring the pressure variation (pressure pulses) in the fluid supply line, manometrically, or with suitable pressure transducer and monitoring means, to determine the magnitude of pressure pulses incident to switching of the fluid flow control valves in various permutations, for identification of optimum operation.

Preferably, the response time, $t_2$, of the throttle valve upon actuation thereof is less than 20% of the transition time $t_1$ of the main flow control valves. Most preferably, the response time, $t_2$, of the throttle valve upon actuation thereof is less than 10% of the transition time $t_1$ of the main flow control valves.

In such application of catalytic oxidation of VOC in effluent gas streams, the pressure pulse damping arrangement of the present invention achieves a substantial reduction in the magnitude of pressure variation. In an illustrative undamped system of the prior art, the pressure surges incident to valve switching were on the order of approximately one inch water. Use of the pressure pulse damping arrangement of the present invention permits reduction of such pressure variation in such system to levels on the order of ±0.1 inch water.

Figure 2:
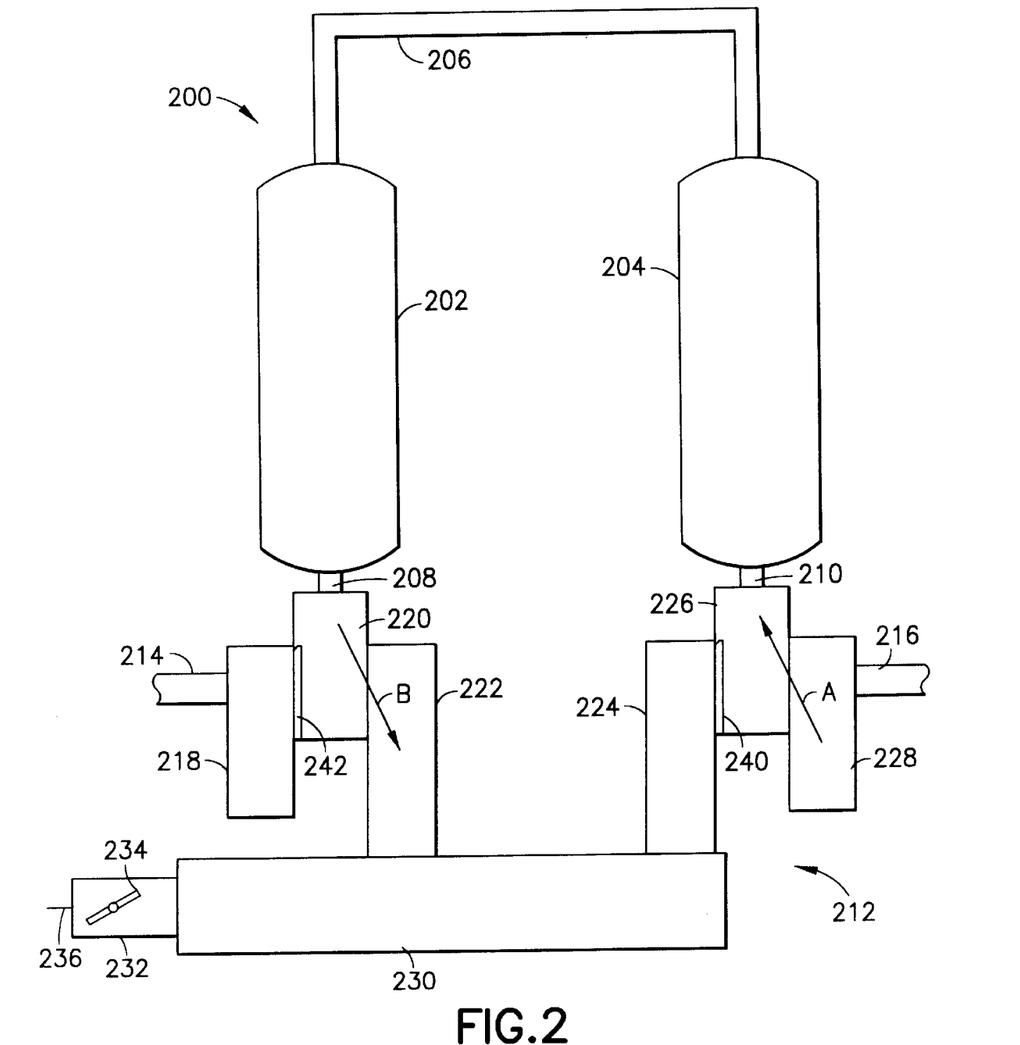
FIG. 2 is a schematic representation of a multi-vessel catalytic oxidation system according to the invention, in an illustrative embodiment thereof, showing the inlet/outlet valved manifold during operation with one vessel on-stream, and the other vessel off-stream.

FIG. 2 is a schematic representation of a multi-vessel catalytic oxidation system 200 according to the invention, in an illustrative embodiment thereof, showing the inlet/outlet valved manifold during operation, with one vessel on-stream, and the other vessel off-stream. The catalytic oxidation system 200 in FIG. 2 comprises vessels 202 and 204, each of which may be constructed analogously to the vessels shown in the embodiment of FIG. 1. At their respective upper ends, the vessels 202 and 204 are joined with one another by a flow conduit 206.

The catalytic oxidation system 200 comprises valved manifold 212 which includes, associated with vessel 202, a left-hand valve including valve inlet 218 coupled to inlet feed line 214, active volume 220 of the valve coupled by flow conduit 208 to vessel 202, and valve discharge 222 coupled to the outlet manifold 230 communicating with throttle valve chamber 232 containing butterfly valve 234. The throttle valve 232 discharges processed gas in line 236, which is passed to a blower (not shown in FIG. 2) as described hereinabove in connection with the embodiment of FIG. 1.

In like manner, vessel 204 is associated with a right-hand valve comprising valve inlet 228 joined to fluid feed conduit 216, with the valve comprising active volume 226 joined to vessel 204 in flow communication therewith, via flow conduit 210. Valve discharge 224 communicates with the outlet manifold 230.

Each of the valves in FIG. 2 has a valve element, schematically shown as valve element 242 in the left-hand valve and as valve element 240 in the right-hand valve. These valve elements are translatable to establish or occlude gas flow between the active volume of the valve and the respective inlet and discharge thereof.

As shown in FIG. 2, the left-hand valve has valve element 242 occluding flow communication between inlet 218 and the active volume 220, to accommodate flow of fluid from vessel 202 through flow conduit 208 into the valve and passage through the active volume 220 and discharge 222 to manifold 230.

Concurrently, the valve element 240 in right-hand valve is disposed to occlude flow communication between the active volume 226 and the discharge 224 of the valve, to accommodate flow of influent fluid from feed line 216 through inlet 228 to active volume 226, and subsequent flow through flow conduit 210 to vessel 204, and from vessel 204 through conduit 206 to vessel 202.

In the mode shown in FIG. 2, the influent gas flows through the right-hand valve in the direction indicated by arrow A while process gas discharges through the left-hand valve in the direction indicated by arrow B and flows into discharge manifold 230.

An example suffices to show the features and improvements of the invention, with reference to FIG. 2. The pressure drop across vessels 202 and 204 in the FIG. 2 system, as constructed for catalytic oxidation treatment of the gas introduced in inlet feed conduit 216 (which may be joined to an inlet feed gas manifold also coupled to inlet feed conduit 214) may for example be 20 inches water. Correspondingly, a pressure differential of 17.5 inches water may exist across each of the left-hand and right-hand valves, between inlet 218 and active volume 220 in the left-hand valve, and between discharge 224 and active volume 226 in the right-hand valve.

As soon as the respective valves begin to move off their seats during switching of the valves, air rushes from the inlet at minus 2.5 inches water to the outlet at minus 20 inches of water, creating a pressure pulse. The duration of this pulse is approximately equal to the length of time the flow-switching valves are in transition, but the pulse will always occur due to the pressure differential which exists within the valve chambers.

Figure 3:
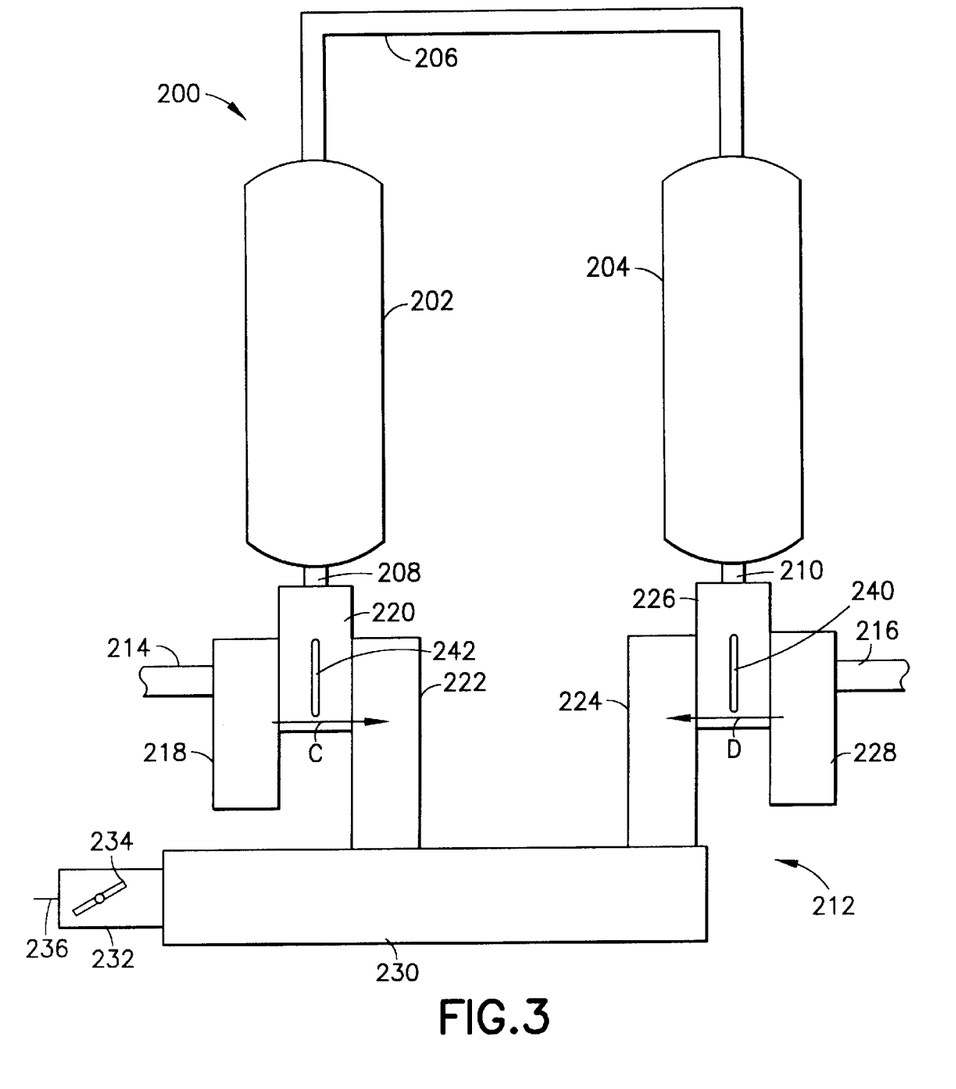
FIG. 3 is a schematic representation of the FIG. 2 system, during switchover of the valves associated with the manifold.

FIG. 3 is a schematic representation of the FIG. 2 system, during switchover of the valves associated with the manifold. The elements of FIG. 3 have been correspondingly numbered with respect to the same elements in FIG. 2. In FIG. 3, the valve elements 240 and 242 are in transition during switchover of the right-hand and left-hand valves of the system, thereby permitting flows directly from the inlet to the outlet of each valve, driven by the 17.5 inch water pressure differential, with respective flows in the left-hand and right-hand valves being indicated by arrows C and D.

In the system shown in FIGS. 2 and 3, experiencing a 20 inch water pressure differential, it is apparent that if the pressure in the outlet could be increased during the switching of the valves, the pressure pulse seen at the inlet would be substantially reduced. The butterfly valve 234 is utilized to effectuate such pressure damping. This butterfly valve is selectively actuated (by means not shown, but including suitable valve actuator means) so that it partially closes at the same time the main flow control valves are cycled, to increase the pressure in the discharge manifold 230. Subsequently, opening the butterfly valve from its partially closed position restores the (minus 20 inches water) pressure differential as the left-hand and right-hand valves complete their cycle.

A butterfly valve of the type shown in FIG. 3 may be selectively adjusted by means of an adjustable stroke cylinder (not shown) operatively coupled therewith. The adjustable stroke cylinder may be driven by a solenoid valve (also not shown), which can be coupled with solenoids for actuating the main flow control valves, by use of electrical circuit elements including relays. With such active pressure control device according to the invention, comprising the throttle valve and the associated downstream blower, the pressure at the discharge manifold 230 will increase momentarily while the switchable valves comprising valve elements 240 and 242 are in transition. The pressure will then be restored to its operating level when the main flow control valves have completed their switching.

Although the invention has been illustratively described above in connection with a catalytic oxidation system of the type schematically shown in FIGS. 1–3, it will be recognized that the applicability of the invention is not thus limited, but extends to any fluid flow circuit having a switchable flow control means therein which is selectably switchable to reverse or redirect the flow in the flow circuit, and which in the act of switching generates an upstream-propagating pressure surge. The pressure surge is attenuated in accordance with the present invention by use of a throttle valve which is appropriately adjusted to, at least, partially dampen such pressure surge, preferably by having a response time which is significantly faster than the flow-reversing or redirecting flow control means in the circuit.

It will be recognized further that the invention is useful in other types of oxidation systems, including regenerative oxidation systems as well as catalytic oxidation systems, in addition to numerous other process systems having periodic redirected flows in the flow circuit(s) thereof.

While the invention has been described herein with reference to various illustrative features, aspects and embodiments, it will be recognized that the invention is not thus limited, but rather extends in utility to other variations, modifications, and embodiments. The present invention is therefore to be broadly construed and interpreted as encompassing within its spirit and scope as hereinafter claimed, all of such alternative variations, modifications and other embodiments.

What is claimed is:

1. A pressure surge damping system for damping pressure perturbations incident to switching of cyclically switched flow control means in a fluid flow circuit, wherein the switching of the cyclically switched flow control means chances the direction or path of fluid flow in the fluid flow circuit, said pressure surge damping system comprising a throttle valve in said circuit, wherein the throttle valve and the cyclically switched flow control means are constructed and arranged for coordinated actuation comprising selective adjustment of the throttle valve in timed coordination with the switching of the cyclically switched flow control means, to suppress pressure perturbations incident to switching of the cyclically switched flow control means.

2. A pressure surge damping system according to claim 1, wherein the cyclically switched flow control means are periodically actuated to switch the direction of fluid flow.

3. A pressure surge damping system according to claim 1, wherein the cyclically switched flow control means comprises a reversible flow valve.

4. A pressure surge damping system according to claim 1, wherein a catalytic oxidation treatment unit is disposed in the fluid flow circuit, and arranged for treatment of gas flowed through the circuit to abate the VOC content thereof.

5. A pressure surge damping system according to claim 1, further including an upstream supply of fluid for flow through the circuit and a downstream discharge portion of said circuit, with a fluid driver disposed in said downstream discharge portion of said circuit, downstream of the cyclically switched flow control means, said fluid driver having an upstream inlet and a downstream discharge, and with the throttle valve disposed in the downstream discharge portion of said circuit, between the cyclically switched flow control means and said fluid driver upstream inlet, wherein the fluid driver comprises a device selected from the group consisting of blowers, compressors, and fans.

6. A pressure surge damping system according to claim 1, wherein the throttle valve comprises a butterfly valve.

7. A pressure surge damping system according to claim 1, wherein the response time of the throttle valve is faster than the response time of the flow control means.

8. A pressure surge damping system according to claim 1, wherein said fluid flow circuit comprises a manifolded assembly of multiple fluid treatment vessels, which are sequentially and alternatingly switched between an active fluid processing state and a non-active regenerating state, by switching of the cyclically switched flow control means.

9. A pressure surge damping system according to claim 8, wherein fluid is flowed through at least one of the multiple fluid treatment vessels in said active fluid processing state, and contemporaneously through at least one other of the multiple fluid treatment vessels in said nonactive regenerating state.

10. A process for damping pressure perturbations incident to switching of cyclically switched flow control means in a fluid flow circuit, said process comprising:

flowing fluid in the fluid flow circuit in a first direction of flow;

cyclically and continuingly switching the cyclically switched flow control means in said fluid flow circuit causing the fluid to flow in a second direction of flow reverse to the first direction whenever the cyclically switched flow control means is switched causing a pressure perturbation in the fluid flow circuit; and during switching of the cyclically switched flow control means in said fluid flow circuit, throttlingly adjusting the flow of fluid in the fluid flow circuit to suppress pressure perturbations incident to switching of the cyclically switched flow control means;

wherein the flow of fluid in the fluid flow circuit at the time of switching of the cyclically switched flow control means is throttlingly adjusted in timed coordination with switching of the cyclical switchable flow control means, to generate sufficient back pressure in the fluid flow circuit to match the loss of flow resistance during the switching of the cyclically switched flow control means.

11. A pressure surge damping system for damping pressure perturbations incident to switching of cyclically switched flow control means in a fluid flow circuit, wherein the switching of the cyclically switched flow control means changes the direction or path of fluid flow in the fluid flow circuit, said pressure surge damping system comprising:

a throttle valve in said circuit, wherein the throttle valve and the cyclically switched flow control means are constructed and arranged for coordinated actuation by cycle time control means to effect selective adjustment of the throttle valve in timed coordination with the switching of the cyclically switched flow control means, wherein said cycle time control means are constructed and arranged to actuate the throttle valve to partially close at a time selected from the group consisting of:
  (i) a time just before the time at which the cyclically switched flow control means are actuated to reverse the direction or path of fluid flow in the fluid flow circuit;
  (ii) at the same time that the cyclically switched flow control means are actuated to reverse the direction or path of fluid flow in the fluid flow circuit; and
  (iii) a time just after the time at which the cyclically switched flow control means are actuated to reverse the direction or path of fluid flow in the fluid flow circuit; and wherein the partial closure of the throttle valve is carried out (a) at a sufficient rate of response, (b) for a sufficient intermittent time and (c) to sufficient extent, to suppress pressure perturbations when the cyclically switched flow control means are actuated to reverse the direction or path of fluid flow in the fluid flow circuit.

12. A pressure surge damping system according to claim 11, wherein the cycle time control means actuate the throttle valve to partially close just before the cyclically switched flow control means are actuated to reverse the direction or path of fluid flow in the fluid flow circuit.

13. A pressure surge damping system according to claim 11, wherein the cycle time control means actuate the throttle valve to partially close at the same time that the cyclically switched flow control means are actuated to reverse the direction or path of fluid flow in the fluid flow circuit.

14. A pressure surge damping system according to claim 11, wherein the cycle time control means actuate the throttle valve to partially close just after the cyclically switched flow control means are actuated to reverse the direction or path of fluid flow in the fluid flow circuit.

15. A pressure surge damping system according to claim 11, wherein the throttle valve has a response time $t_2$ upon actuation by the cycle time control means, that is less than 20% of the response time $t_1$ of the cyclically switched flow control means to reverse the direction or path of fluid flow in the fluid flow circuit after actuation of the cyclically switched flow control means by the cycle time control means.

16. A pressure surge damping system according to claim 11, wherein the throttle valve, the cyclically switched flow control means, and the cycle time control means are constructed and arranged to maintain a pressure variation in the system on the order of ±0.1 inch water.

17. A pressure surge damping system for damping pressure perturbations incident to switching of cyclically switched flow control means in a fluid flow circuit, wherein the switching of the cyclically switched flow control means changes the direction or path of fluid flow in the fluid flow circuit, said pressure surge damping system comprising:

a throttle valve in said circuit, wherein the throttle valve and the cyclically switched flow control means are constructed and arranged for coordinated actuation by cycle time control means to effect selective adjustment of the throttle valve in timed coordination with the switching of the cyclically switched flow control means, wherein said cycle time control means are constructed and arranged to actuate the throttle valve to partially close at a time selected from the group consisting of:
  (i) a time just before the time at which the cyclically switched flow control means are actuated to reverse the direction or path of fluid flow in the fluid flow circuit;
  (ii) at the same time that the cyclically switched flow control means are actuated to reverse the direction or path of fluid flow in the fluid flow circuit; and
  (iii) a time just after the time at which the cyclically switched flow control means are actuated to reverse the direction or path of fluid flow in the fluid flow circuit; and wherein the partial closure of the throttle valve is carried out (a) at a sufficient rate of response, (b) for a sufficient intermittent time and (c) to sufficient extent, to suppress pressure perturbations when the cyclically switched flow control means are actuated to change the direction or path of fluid flow in the fluid flow circuit;

wherein the throttle valve has a response time $t_2$ upon actuation by the cycle time control means, that is less than 20% of the response time $t_1$ of the cyclically switched flow control means to reverse the direction or path of fluid flow in the fluid flow circuit after actuation of the cyclically switched flow control means by the cycle time control means; and wherein the throttle valve, the cyclically switched flow control means, and the cycle time control means are constructed and arranged to maintain a pressure variation in the system on the order of ±0.1 inch water.

18. A pressure surge damping system according to claim 17, wherein the cycle time control means actuate the throttle valve to partially close just before the cyclically switched flow control means are actuated to reverse the direction or path of fluid flow in the fluid flow circuit.

19. A pressure surge damping system according to claim 17, wherein the cycle time control means actuate the throttle valve to partially close at the same time that the cyclically switched flow control means are actuated to reverse the direction or path of fluid flow in the fluid flow circuit.

20. A pressure surge damping system according to claim 17, wherein the cycle time control means actuate the throttle valve to partially close just after the cyclically switched flow control means are actuated to reverse the direction or path of fluid flow in the fluid flow circuit.

21. A pressure surge damping system according to claim 17, wherein the cycle time control means actuate the throttle valve to partially close so that the throttle valve in partially closing generates sufficient back pressure in the fluid flow circuit to match the pressure drop when the flow control means are switched to reverse the direction or path of fluid flow in the fluid flow circuit.

* * * * *